(12) United States Patent
Chen et al.

(10) Patent No.: US 10,671,932 B1
(45) Date of Patent: Jun. 2, 2020

(54) SOFTWARE APPLICATION SELECTION MODELS INTEGRATION

(71) Applicants: Meng Chen, Mountain View, CA (US); Bei Huang, San Jose, CA (US); Ngoc Nhung Thi Ho, San Jose, CA (US)

(72) Inventors: Meng Chen, Mountain View, CA (US); Bei Huang, San Jose, CA (US); Ngoc Nhung Thi Ho, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 756 days.

(21) Appl. No.: 15/417,651

(22) Filed: Jan. 27, 2017

(51) Int. Cl.
*G06N 5/04* (2006.01)
*G06N 7/00* (2006.01)
*G06F 17/16* (2006.01)
*G06N 20/00* (2019.01)

(52) U.S. Cl.
CPC .............. *G06N 5/04* (2013.01); *G06F 17/16* (2013.01); *G06N 7/00* (2013.01); *G06N 20/00* (2019.01)

(58) Field of Classification Search
CPC . G06N 5/04; G06N 20/00; G06N 7/00; G06F 17/16
See application file for complete search history.

(56) References Cited

U.S. PATENT DOCUMENTS

| | | | | |
|---|---|---|---|---|
| 9,779,441 | B1* | 10/2017 | Jadhav | G06Q 30/0627 |
| 2011/0028138 | A1* | 2/2011 | Davies-Moore | G06F 3/04817 |
| | | | | 455/418 |
| 2012/0254077 | A1* | 10/2012 | Porikli | G06N 20/00 |
| | | | | 706/12 |
| 2012/0278339 | A1* | 11/2012 | Wang | G06F 17/21 |
| | | | | 707/748 |

* cited by examiner

*Primary Examiner* — Austin Hicks
(74) *Attorney, Agent, or Firm* — Ferguson Braswell Fraser Kubasta PC

(57) ABSTRACT

A method for recommendation model integration includes obtaining, using a first model, multiple text scores ranking multiple software applications according to a first user submitted terms in a source software application, and obtaining, using a second model, multiple feature scores ranking the software applications according to multiple features of the software applications. The method further includes integrating the text scores and the feature scores to generate multiple combined scores for the software applications, and presenting, to a user, the software applications according to the combined scores.

12 Claims, 9 Drawing Sheets

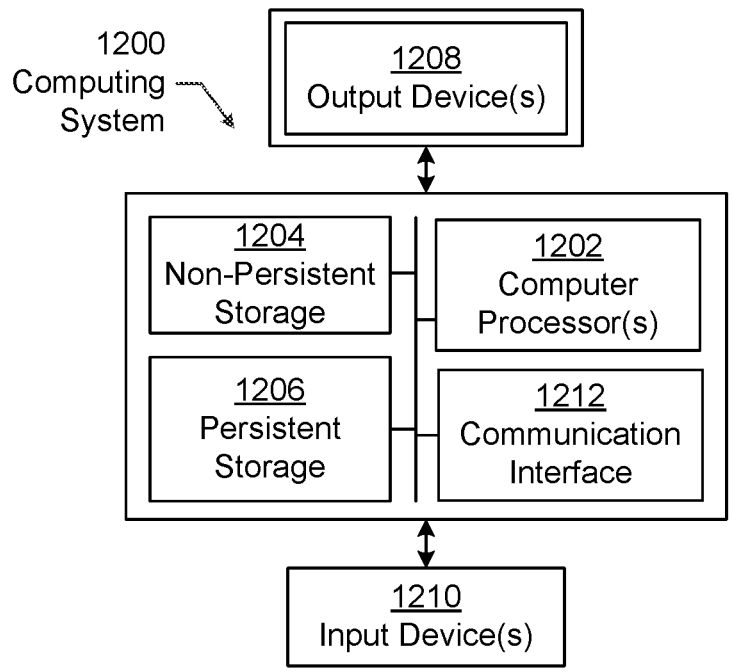
FIG. 12.1
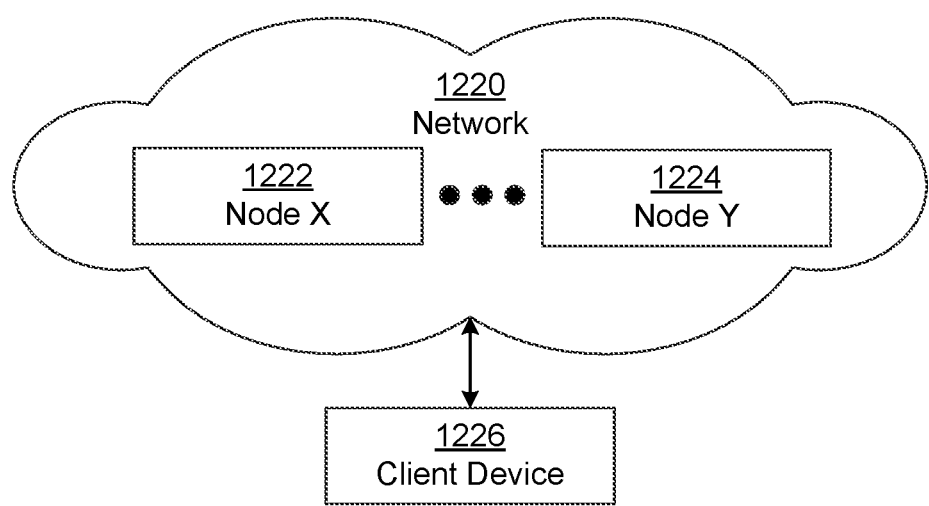
FIG. 12.2

US 10,671,932 B1

SOFTWARE APPLICATION SELECTION MODELS INTEGRATION

BACKGROUND

With the widespread adoption of the Internet and the improvement in integrated development environments, the number of software application developers and, correspondingly, software applications has increased substantially. End users may select from the various software applications that can be locally or remotely executed. To select from the various software applications, the user typically submits a name of a software application or selects from a menu of available software applications. However, with the limits in screen size, network bandwidth, processing power, and time, the number of software applications that may be concurrently presented to an end user is necessarily limited.

Various methodologies exist to recommend and present software applications to end users. Each methodology has an underlying assumption about the end user's selection process. For example, recommendations based on other end users that select a same software application as the target end user makes the assumption that the target end user has similar interests to the other end users simply by selecting the same prior software application.

SUMMARY

In general, in one aspect, one or more embodiments relate to a method for recommendation model integration. The method includes obtaining, using a first model, multiple text scores ranking multiple software applications according to a first user submitted terms in a source software application, and obtaining, using a second model, multiple feature scores ranking the software applications according to multiple features of the software applications. The method further includes integrating the text scores and the feature scores to generate multiple combined scores for the software applications, and presenting, to a user, the software applications according to the combined scores.

A system for recommendation model integration, including a data repository for storing a first user submitted terms and multiple software application data, and a computer processor executing a market application. The market application includes a first model for obtaining multiple text scores ranking multiple software applications according to the first user submitted terms in a source software application, a second model for obtaining multiple feature scores ranking the software applications according to multiple features of the software applications, the features obtained from the software application data in the data repository, a model integrator for integrating the text scores and the feature scores to generate multiple combined scores for the software applications, and a user interface for presenting the software applications according to the combined scores.

A non-transitory computer readable medium for recommendation model integration, including computer readable program code for obtaining, using a first model, multiple text scores ranking multiple software applications according to a first user submitted terms in a source software application, and obtaining, using a second model, multiple feature scores ranking the software applications according to multiple features of the software applications. The computer readable program code is further for integrating the text scores and the feature scores to generate multiple combined scores for the software applications, and presenting, to a user, the software applications according to the combined scores.

Other aspects of the invention will be apparent from the following description and the appended claims.

BRIEF DESCRIPTION OF DRAWINGS

FIGS. 12.1 and 12.2 show a computing system in accordance with one or more embodiments of the invention.

DETAILED DESCRIPTION

Figure 1:
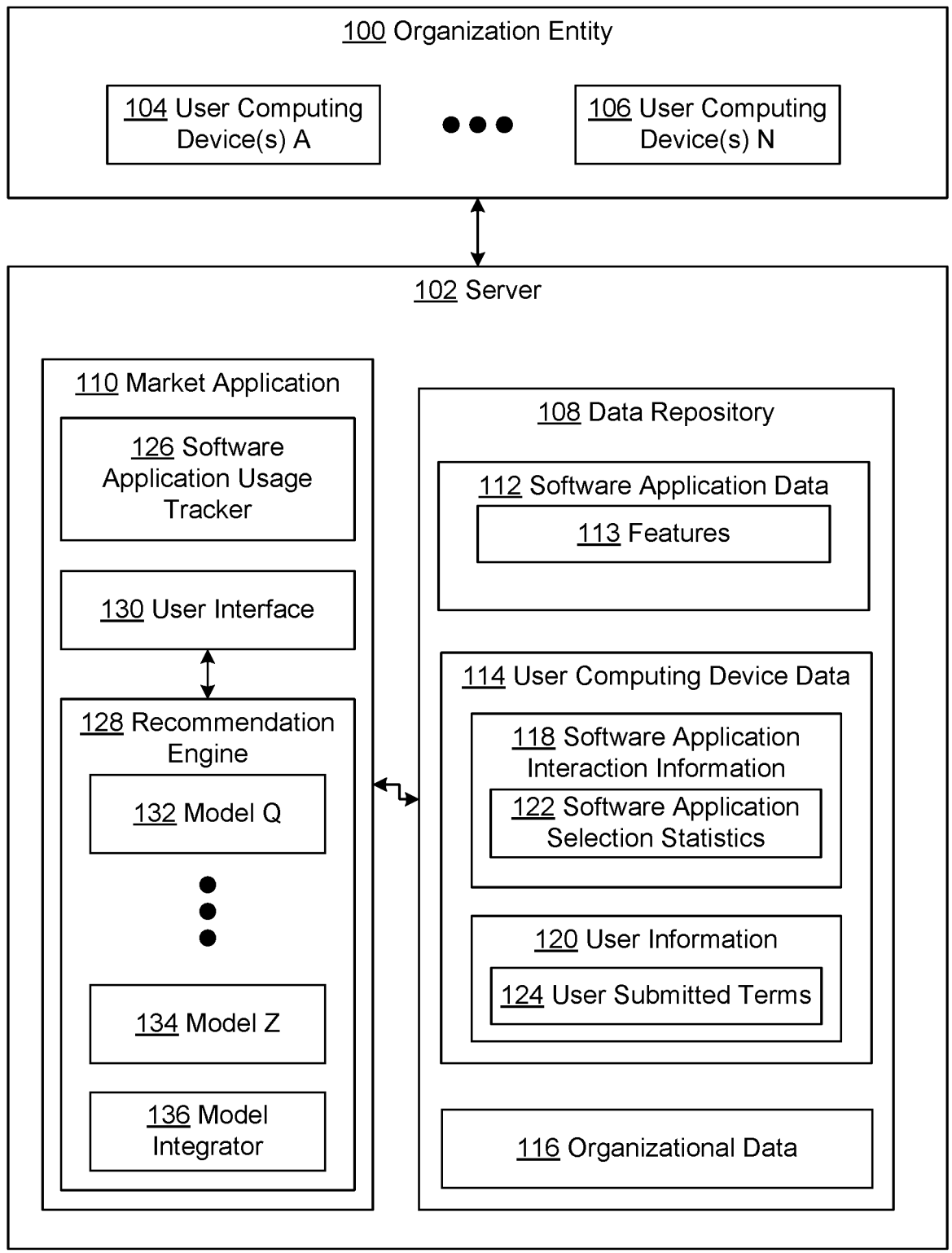
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this description, ordinal numbers (e.g., first, second, third, etc.) may be used as an adjective for an element (i.e., any noun in the description). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A user as used herein refers to any individual or entity that performs an action (e.g., using a computing device). A user is deemed to perform an action when an action is performed on behalf of a user. Further, the use of the terms, "relates" and "relationship," between two objects as used herein refers to a link, reference, cross reference or other direct connection between the two objects.

In general, embodiments of the invention address how applications (i.e., software applications) are recommended to target end users in a networking environment by combining the output of different models. For example, a first model generates text scores that rank software applications according to user submitted terms in a source software application. A second model generates feature scores according to the features of the software applications. The text scores and feature scores are combined to generate combined scores. The software applications are presented to a user for selection according to the combined scores.

FIG. 1 shows a diagram of a system in accordance with one or more embodiments of the invention. As shown in FIG. 1, the system includes a server (102) with multiple components. The server (102) is connected to an organization entity (100). In one or more embodiments of the invention, the organization entity (100) is a business organization (e.g., corporation, non-profit organization, limited liability company, partnership, or other such business organization having a defined personnel structure). The organization entity (100) includes user computing devices (e.g., user computing device A (104), user computing device N (106)).

Each user computing device (e.g., user computing device A (104), user computing device N (106)) may correspond to the computing device discussed below with reference to FIG. 12. Further, one or more of the various user computing devices may be virtual computing devices that execute in a virtualized environment via physical hardware. The user computing device is a computing device that is used by an end user for the organization entity. The end user may be a target end user or a source end user. A target end user is an end user that is the target for the recommendations. In other words, the target end user is the end user for which the software applications are presented to recommend. The source end user provides information that may be used to provide a recommendation to another. For different executions, the target end user in a first execution may be the source end user in another execution. Conversely, the source end user in the first execution may be a target end user in another execution. A single end user may have multiple user computing devices. The organization entity may or may not own the user computing device.

Continuing with FIG. 1, the organization entity (100) is connected to server (102). In particular, the user computing devices (e.g., user computing device A (104), user computing device N (106)) are configured to be communicatively connected to server (102). The connection may be direct or indirect, such as via a network. In particular, the server (102) includes functionality to process requests from the user computing devices. For example, the server may be an external server with respect to the organization entity (100). By way of another example, the server may be an internal server of the organization entity.

The server (102) includes a data repository (108) and a market application (110). In one or more embodiments of the invention, the data repository (108) is any type of storage unit and/or device (e.g., a file system, database, collection of tables, or any other storage mechanism) for storing data. Further, the data repository (108) may include multiple different storage units and/or devices. The multiple different storage units and/or devices may or may not be of the same type or located at the same physical site.

The data repository (108) includes software application data (112), user computing device data (114), and organizational data (116). Software application data (112) is data describing a software application. For example, the software application data (112) includes features (113 of the software application. The features (113) are the characteristics that the software application directly has. By way of an example, the features may be identification information, latent features, and published features. The identification information includes application title, application description, version number, vendor, edition, search terms, licensing information, type of software application, and other such information. The published features may include vendor published features, such as pre-defined search keywords, actions capable of being performed by the software application. Latent features are features that may be learned about the software application. For example, the latent features may include the number of users connected to the software application, survey data, application review comments, statistics about usage of the software application (e.g., the amount of time that users actively use the software application, amount of time that the users are connected to the software application, and other usage statistics).

User computing device data (114) is information about the user's computing device. As discussed above, where the user computing device is a virtual environment that is defined for a user and executes on a physical device, the user computing device data may be with respect to the virtual environment and/or physical environment. The user computing device data (114) includes software application interaction information (118) and user information (120). Software application interaction information (118) defines how the particular computing device (e.g., user computing device A (104), user computing device N (106)) interacts with one or more software applications. The software application interaction information (118) includes software application selection statistics (102). The software application selection statistics (102) specify with which software applications that the user computing device is connected. A computing device is connected to the software application when the software application is installed on the computing device, is in a list of software applications that the user of the computing device has a license to use on the computing device, or that the user has otherwise selected and the software application may be used on the computing device.

Although not shown, software application interaction information (118) may include information statistics about the usage of each software application by the computing device. For example, the usage statistics may be the duration of time that the software application is opened, the number of times the software application is used, the aggregated duration of time for opening the software application, and other information. Other usage statistics may be collected and stored without departing from the scope of the invention.

User information (120) is information about the user of the user computing device. For example, user information (120) includes administrative information, such as name, mailing address, email address, role within the organization entity (100), the one or more departments in the organization entity (100) that the user is a member, user name, security credentials, and other information. The user information (120) includes user submitted terms (124). User submitted terms (124) are words or phrases that the user enters or selects in a source software application. In other words, the user may submit the words or phrases by selecting checkboxes, radio buttons, drop-down menus, or other widgets or entering the words or phrases in a text box. Example user submitted terms include company name, industry name, link to a bank account where the system can obtain bank account name, and other user submitted terms. The source software application is a software application with which the user is connected that is not the market application (110). Thus, the source software application is a source of user data. In other words, the source software application is an independent software application that may store data on the server (102). An example source software application is a financial management software application that manages the monetary transactions of a user (e.g., with the user's customers and vendors). Although FIG. 1 shows the user information (120) as being within the user computing device data (114), the user information (120) may include the user computing device data (114) for each computing device used by the user.

Organizational data (116) is data about the organization entity. In other words, organizational data (116) may include how the entity is organized with respect to departments and roles, and any other information about the organization entity (100). The other information may include administrative information, such as geographic locations, industries served, name, industry of the organization entity, products offered by the organization entity, and other information.

As shown in FIG. 1, the data repository (108) is connected to a market application (110). The market application (110) is a software application that is configured to implement a software application market and provide recommendations to a user. The market application (110) includes a software application usage tracker (126). The software application usage tracker (126) tracks the software applications with which the user is connected. In other words, the software application usage tracker (126) monitors and stores connection and usage information in the data repository (108).

The market application (110) further includes a recommendation engine (128). The recommendation engine (128) recommends software applications to a user. In other words, the recommendation engine (128) is configured to select a set of software applications with which the user may be interested and rank the software applications. The recommendation engine (128) implements models (e.g., model Q (132), model Z (134)) and a model integrator (136). The models (e.g., model Q (132), model Z (134)) are independent approximation schemes that each estimates a selection and ranking of software applications with which the user may be interested. In other words, each model independent of other models is configured to produce a selection and ranking of the software applications.

The model integrator (136) is configured to aggregate the rankings across the models to create a single ranking. The model integrator (136) may be configured to account for the accuracy of each model when generating the ranking.

Continuing with FIG. 1, the user interface (130) is an interface that is presents the software applications to the user. The user interface (130) may be a graphical user interface that receives information from a user and presents a list of the software applications according to the ranking to the user.

While FIG. 1 shows a configuration of components, other configurations may be used without departing from the scope of the invention. For example, various components may be combined to create a single component. As another example, the functionality performed by a single component may be performed by two or more components. For example, although FIG. 1 shows the models as part of the market application, the models may be implemented in separate software applications that interface with the market application.

FIGS. 2-8 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 2:
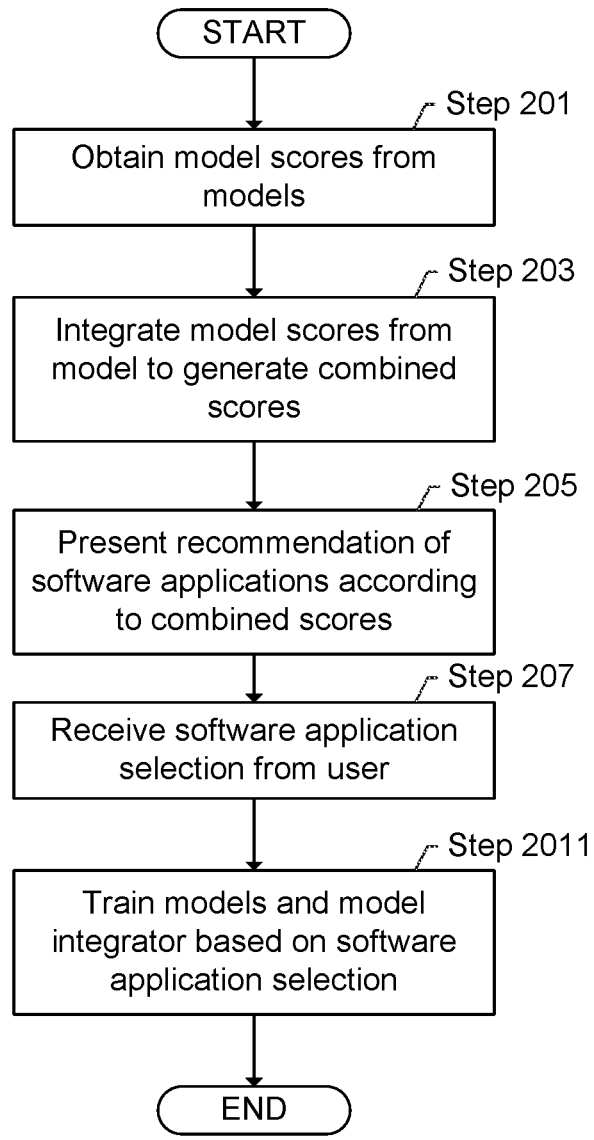
FIGS. 2, 3, 4, 5, 6, 7, and 8 show flowcharts in accordance with one or more embodiments of the invention.

FIG. 2 shows a general flowchart for providing recommendations. The steps of FIG. 2 may be performed by the model integrator of the model software application and the user interface, as described above with reference to FIG. 1.

In Step 201, model scores are received from multiple models. For a particular user and/or user computing device, the models are individually executed. The execution of the models may be performed in whole or in part in serial. Similarly, the execution of the models may be performed in whole or in part in parallel. When the models execute, the models provide results of the execution to the model integrator. The results are in the form of model scores that the models assign to at least a subset of available software applications. In other words, each model score is a value assigned to the corresponding software application by the corresponding model, where the value defines the probability estimated by the model that the given user will select the software application. The model scores are specific to the model. In other words, the model scores are individually assigned by the corresponding model.

Figure 3:
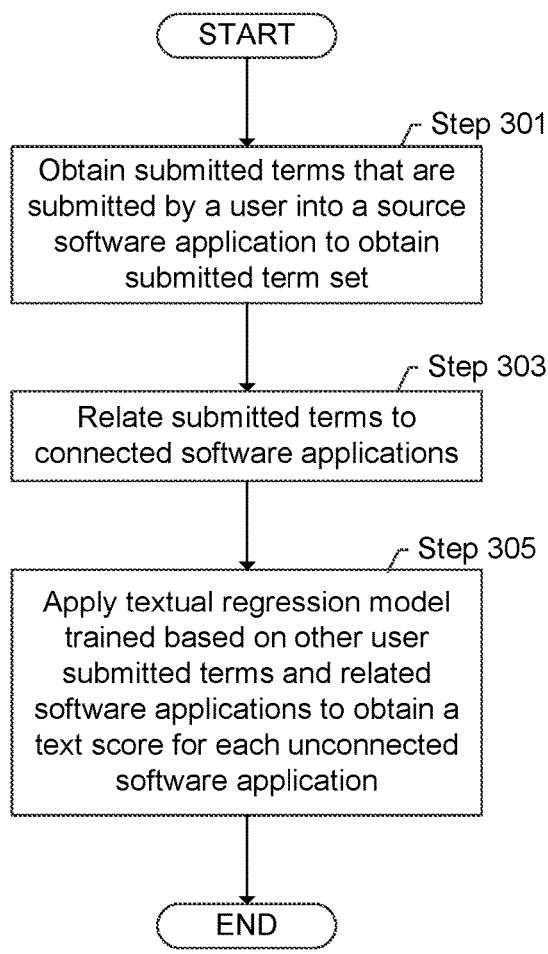
Figure 4:
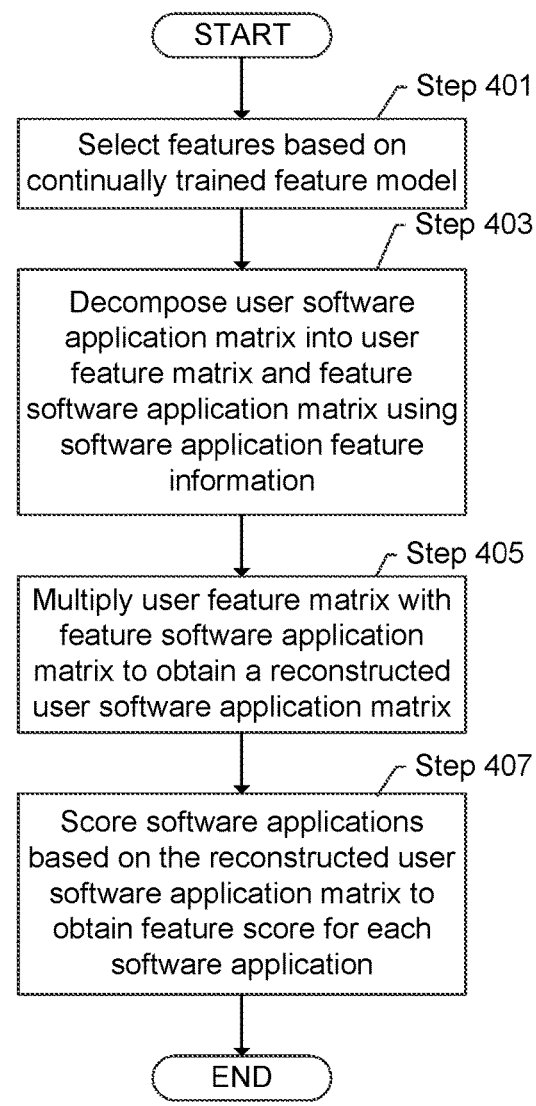
Figure 5:
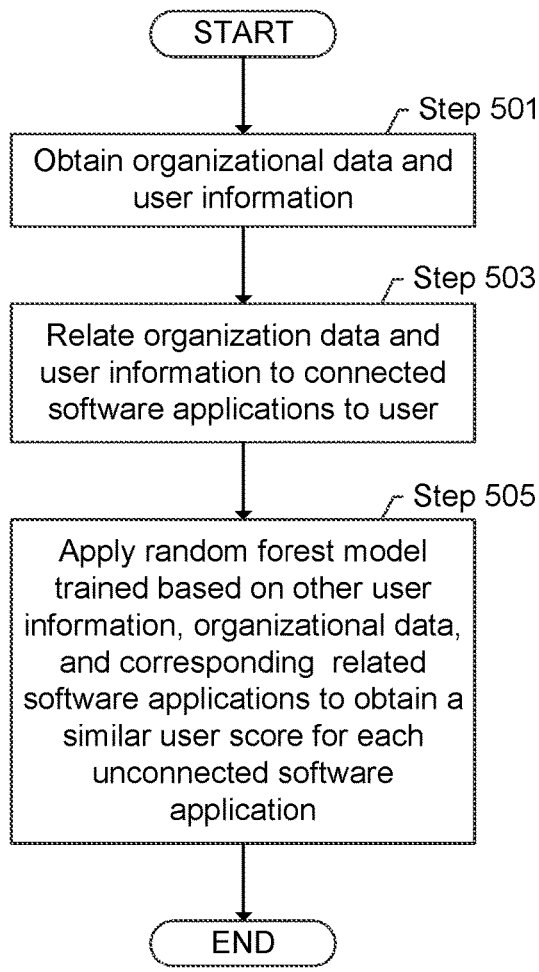

In one or more embodiments of the invention, the model scores are returned for each software application analyzed by the market application. In another embodiment, the model scores are received only for a defined number of software applications, such as the twenty software applications with the best ranking. FIGS. 3-5 show flowcharts for example models to generate model scores.

In Step 203, the model scores from the models are integrated to generate combined scores. The model integrator combines the model scores from the multiple models to generate the combined scores for the software application. The combination, for a particular software application, may be performed by calculating a mathematical function of the model scores assigned to a software application. The combination may be performed by identifying the ranking of the software applications for each model, using a ranking assigned to the models, and concatenating the rankings of the software applications in an order defined by the ranking of the models. In one or more embodiments of the invention, regardless of whether the integration is by applying a mathematical function or through concatenation, the model integrator includes functionality to perform the combination based on a learned accuracy of each of the models. Thus, models that are more accurate are given greater weight while combining than the models that are deemed less accurate. The accuracy level for the models may be across the users or for a single user or user computing device.

In Step 205, the recommendation of the software applications is presented according to the combined scores. In one or more embodiments of the invention, presenting the recommendation may be performed by presenting a list of software applications ordered in the list according to the combined scores. Thus, software applications with the greatest combined score (i.e., optimal score indicating most likely to be selected) are presented in the list prior to software applications with less optimal combined scores. In one or more embodiments of the invention, the list may be a list of software application names, a list of icons and names, or any other listing of software applications. Further, presenting the list may be to display the list, transfer the list to a user's computing device, playing the list for oral selection by a user, otherwise exhibiting the list, or performing any combination thereof.

In Step 207, a software application selection is received from the user. The user may select a software application using any technique of a user interface. The selection indicates that the user wants to connect to the software application.

In Step 209, the models and model integrator are trained. Machine learning is used to train the models and model integrator. For example, the model integrator is trained to give a greater weight to the more accurate models that assigned the selected software application with a more optimal model score than the models that assigned the selected software application with a less optimal model score. Further, information about the selected software application is passed to the models. The models or a trainer of the models may use the information about the software application that is selected to update the parameters and weights by which the models determine model scores for the software applications. Thus, the training is performed on at least two levels, the model level and the model integrator level. The result of the training is a more accurate prediction of the selected software applications. By incorporating the model scores for multiple models and training on the at least two levels, one or more embodiments incorporate the strengths of the models while reducing the effects of the assumptions and weakness of the models in the recommendations that are presented.

FIG. 3 shows a flowchart for a textual regression model to generate a text score as the model score for a software application. In Step 301, submitted terms that are submitted by a user into a source software application are obtained. The submitted terms form a submitted term set. For example, obtaining the submitted terms may be performed by accessing the data repository that stores the submitted terms for the source software application to use. In particular, the source software application may store the submitted terms in a shared data repository that is shared with the model. By way of another example, the user submitted terms may be obtained via a software application programming interface of the source software application. The terms in the user submitted term set may explicitly or implicitly include an attribute value pair. For example, if the user submitted term is for household income, the attribute is household income and the value may be forty thousand. The value may be the user submitted term and the attribute defines what the value represents.

In Step 303, the user submitted terms are related to connected software applications. In other words, the software applications that the user is connected to is related to the user submitted terms in the model. In one or more embodiments, a selected subset of user submitted terms are related to each of the software applications to which the users are connected. The selected subset may be the user submitted terms that match a set of attributes, where the attributes in the set may be learned by the textual regression model. For example, if the model learns that the industry description is particularly relevant to identifying probably selected software applications, then the attribute values related to the attribute of industry description (i.e., terms that describe the industry as provided by the user) are related to the software applications that are connected to the user.

In Step 305, a textual regression model trained based on other user submitted terms and other related software applications is applied to obtain a text score for each unconnected software application. The textual regression model performs a regression on the terms and the connected software applications to assign a score to each software application for the user.

FIG. 4 shows a flowchart for using features of the software applications with which the user is connected to assign a feature score for each software application to which the user is not connected. In Step 401, features are selected based on a continually trained feature model. In other words, the feature model identifies the features of the software applications that are predictive of whether a user will select the software application. The feature model is trained based on other selections by a user and other users of the software application.

In Step 403, a user software application matrix is decomposed into a user feature matrix and the feature software application matrix using software application feature information. The user software application matrix relates each user computing device or user to the software applications with which the user computing device is connected. The user feature matrix relates each user with the features of the software application with which the user is connected. Namely, for each software application, the selected features that are selected in Step 401, are related to the users that are connected to the software application. The features of the software application are obtained from the software application feature information in the data repository. In one or more embodiments, the user feature matrix is an n by m matrix where n is the number of users and m is the number of features. The values within the matrix are the number of software applications with which a particular user is connected that has the particular feature. For example, if the value is 10, then a user is connected to 10 software applications that have the corresponding feature.

Additionally, the feature software application matrix relates the software applications to the corresponding features of the software application. The feature software application matrix is an m by x matrix where m is the number of features and x is the number of software applications. The value within the matrix is the prominence of the feature in the software application. The prominence is the degree to which the software application exhibits the feature.

In Step 405, the user feature matrix is multiplied with the feature software application matrix to obtain a reconstructed user software application matrix. In particular, the n by m matrix is multiplied by the m by x matrix to obtain an n by x matrix. The value in the n by x matrix identifies the probability that a particular user will select the corresponding software application.

In Step 407, the software applications are scored based on the reconstructed user software application matrix to obtain a feature score for each software application. The values in the user software application matrix may be normalized to obtain feature scores for each software application. Other processing on the values may be performed to obtain the feature scores from the values.

FIG. 5 shows a flowchart for generating a similar user score for each software application. In other words, FIG. 5 shows a flowchart for using a random forest model to identify software applications that are similar to the target user for which the recommendations are being generated. In Step 501, organizational data and user information is obtained. In Step 503, the organization data and the user information is related to connected software applications of the user. The organization data and user information identifies characteristics of the user and the organization entity of which the user is a member.

In Step 505, a random forest model that is trained based on other user information, organizational data, and corresponding related software applications to obtain a similar user score for each unconnected software application. In other words, the random forest model applies a random forest algorithm to identify similar users and the software applications of the similar users. Based on the software application of the random forest algorithm, the similar user score is obtained for each of the unconnected software applications.

Figure 6:
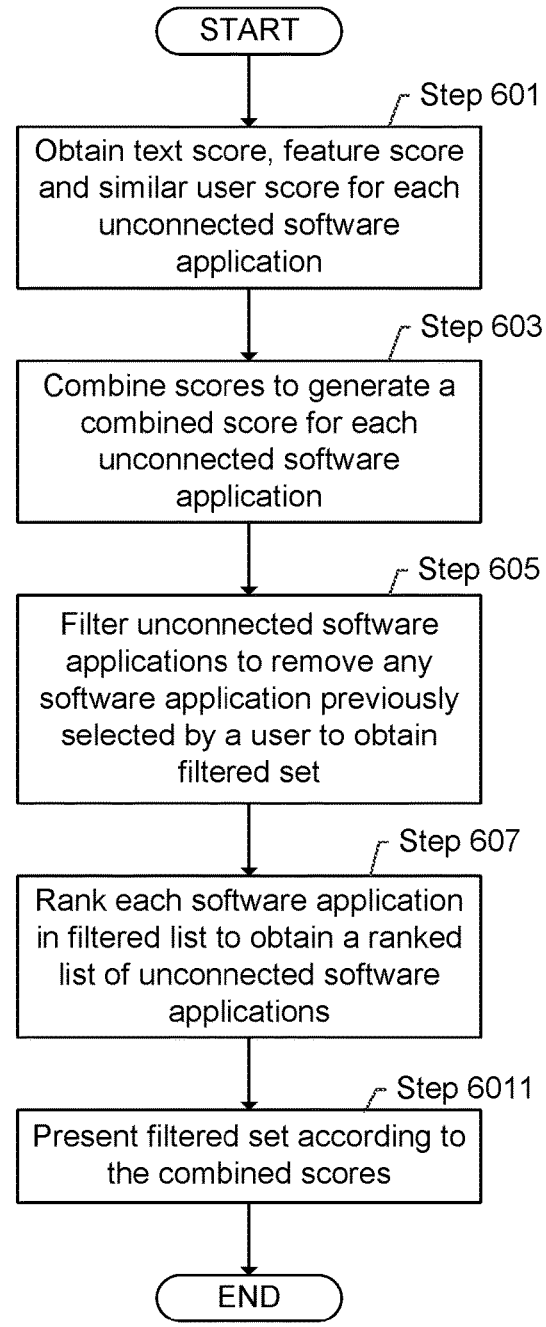

FIG. 6 shows an example flowchart for combining the scores generated in FIGS. 3-5. In Step 601, a text score, feature score, and similar user score are obtained for each unconnected software application in accordance with one or more embodiments of the invention. In particular, the scores are obtained from the corresponding models.

Figure 7:
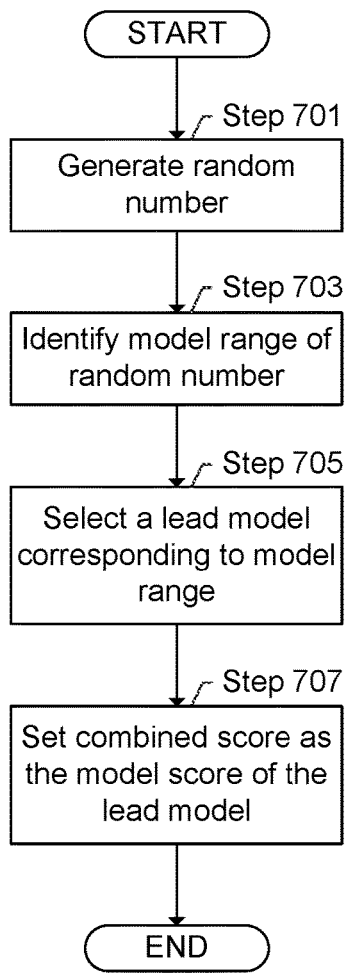
Figure 8:
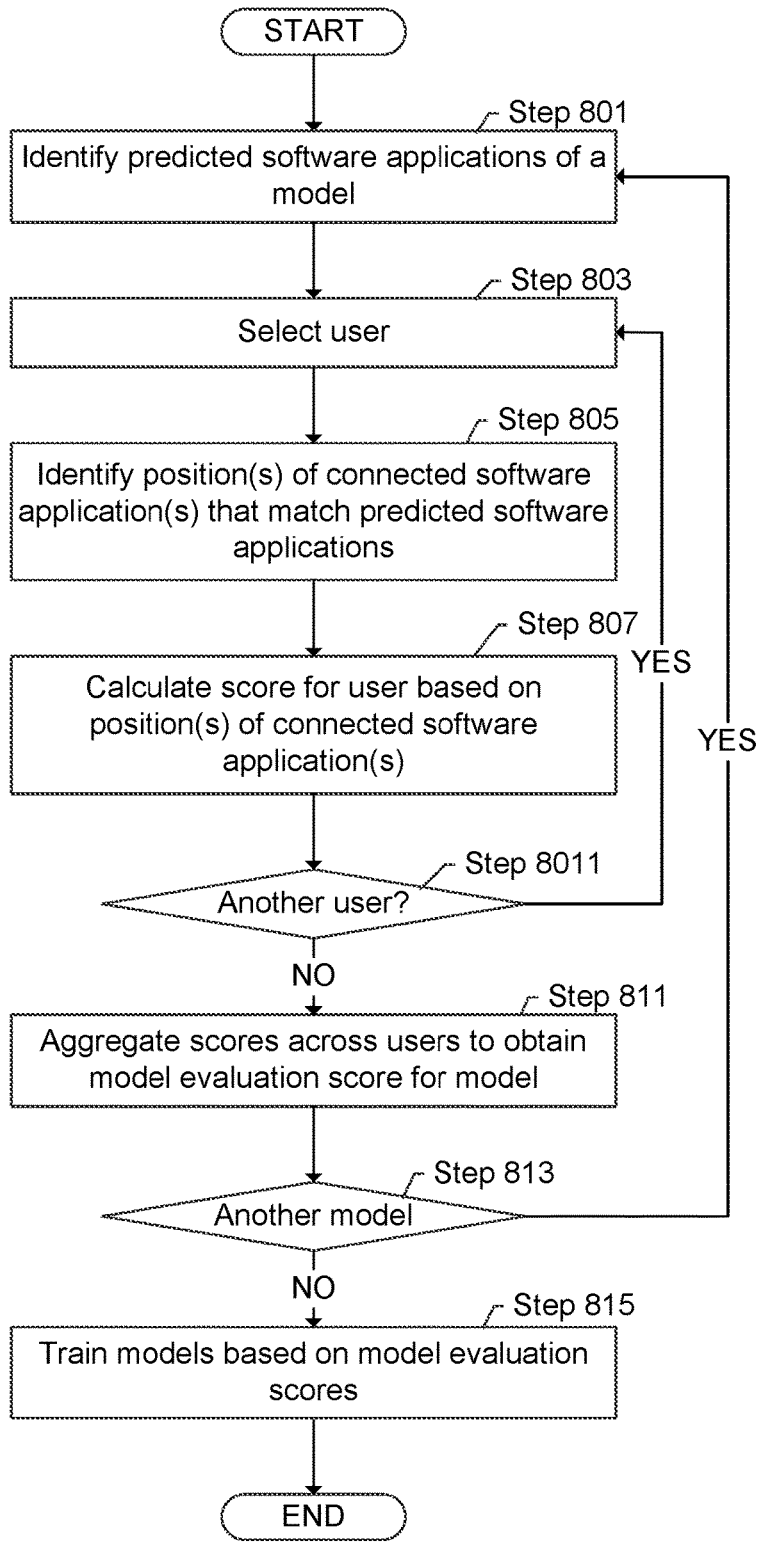

In Step 603, the obtained scores are combined to generate a combined score for each unconnected software application. FIGS. 7 and 8 show example flowcharts for combining scores to generate a combined score for each unconnected software application.

Continuing with FIG. 6, the unconnected software applications are filtered to remove any software applications previously selected by a user to obtain a filtered set in Step 605. In other words, any software applications that were previously selected, and the user is now unconnected, are removed from the list or have a combined score reduction. Thus, a user is not recommended a software application that the user previous reviewed and decided not to connect.

In Step 607, each software application in the filtered list is ranked to obtain a ranked list of unconnected software applications. The ranking orders the unconnected software applications according to the combined score. Randomness may be added to the ranking so that the user is not repetitively recommended the same set of software applications. For example, to add randomness to the ranking, the following steps may be performed. A rank is determined from the combined score. The rank may be a sequential value assigned to each software application according to a value order of the combined scores. A revised score is calculated from the ranking. The revised score is set as the log of the rank added to e, where e is selected from the Normal distribution of the range 0 and log(2).

In Step 609, the filtered set is presented according to the combined scores. In other words, the software applications in the filtered set are presented. Presenting the software applications may be performed as discussed above with reference to FIG. 2.

FIG. 7 shows a flowchart for generating a combined score in accordance with one or more embodiments of the invention. In particular, FIG. 7 shows a flowchart for selecting a model to use for the model scores as the combined scores. In FIG. 7, each model is assigned a non-overlapping range of values. For example, in the case of integer values, model A may be assigned a range of 1-10; model B may be assigned a range of 11-20; and model C may be assigned a range of 21-30. In at least some embodiments, models are assigned non uniform numbers of values in each range. The number of values in each range is dependent on how accurately the corresponding model predicts the selection by the user. For example, if model B is twice as accurate as model A and model C in the prior example, then model A may be assigned a range of 1-10; model B may be assigned a range of 11-30; and model C may be assigned a range of 31-40.

Turning to FIG. 7, in Step 701, a random number is generated. The random number may be generated using a random number generator.

In Step 703, the model range of the random number is identified. In other words, the range of values that is assigned to a model and that includes the random number is identified.

In Step 705, a lead model corresponding to the identified model range is selected. The lead model is the model that is assigned the model range identified in Step 703.

In Step 707, the combined score of the software applications is set as the model score of the lead model. In other words, the model scores of the lead model become the combined scores of the software applications. If the lead model does not have enough recommended software applications, the flow may proceed back to Step 701 to select another model. In such a scenario, the range of the lead model is removed as a possible set of values for the random number. Thus, the remaining models may be selected. When the remaining models are selected, any software applications recommended by the next model that are already in the lead model's recommended set are removed. Accordingly, any software application is only once in the list of recommended applications. If multiple models are used, the model scores of each subsequent model are set such that the model scores are progressively less optimal than the prior model scores.

Training of the model integrator that implements FIG. 7 may be performed by, for each selection by the user, the model integrator changes the ranges of the models. For example, models that ranked the selected software application lower, may have the range reduced by a defined amount. Conversely, models that ranked the selected software application higher, may have the range increased by a defined amount. The defined amount may be a predefined value (e.g., 1) or defined by a function, such as a function of the ranking of the model (e.g., 1*the rank assigned to the selected software application by the model).

FIG. 8 shows another flowchart for evaluating and training the model integrator. In Step 801, the predicted software applications of a model are identified. In other words, the software applications that are recommended by a model are identified. In Step 803, a user is selected. Based on the selection, the connected software applications to a user are identified. In Step 805, the positions of the connected software application that match the predicted software applications are identified. In other words, consider the scenario in which for user 1, the model predicts software application A, B, and C and only software application B and C is connected to the user 1. In that case, the position or rank of software application B and C as predicted by the model is identified. Thus, if B is ranked as the fourth most probable selection and C is ranked as the second most probable selection, then 4 and 3 are identified in Step 805.

A score is calculated for the user and the model based on the position(s) of the connected software application(s). The score is the result of a mathematical function applied to the positions. For example, the score may be a sum, an average, a medium or another value.

In Step 809, a determination is made whether another user exists for the model. In particular, the Steps of 803-809 are performed for each user or for at least a statistically significant number of users. If the predicted software applications are dependent on the user, then Step 801 may also be repeated for each user.

If another unevaluated user does not exist, the flow proceeds to Step 811. In Step 811, scores are aggregated across users to obtain a model evaluation score for the model. For example, the model evaluation score may be an average of the scores calculated in Step 807. Thus, the model evaluation score shows how well the model predicts the software applications to which the user is connected.

In Step 813, a determination is made whether another model exists. If another model exists, the flow returns to Step 801 so that Steps 801-811 are repeated for each model. Accordingly, each model is assigned a corresponding model evaluation score.

In Step 815, the models are trained based on the model evaluation scores. In other words, the models that did not satisfy a threshold for a model evaluation score are provided with the selected applications and users in order to perform additional learning. Further, the model integrator is trained based on the model evaluation score. For example, if the model integrator implements FIG. 7, described above, then the training is to change the ranges. If the model integrator implements interleaving, whereby the top x model scores of each model are recommended in an order, then the order of the models is defined by the model evaluation scores. By way of an example, if x is 5, model A has a model evaluation score of 13, model B has a model evaluation score of 17, and model C has a model evaluation score of 7, where the lower number is more optimal, then the recommendations of software applications are in the following order: top 5 recommendations of model C are presented, the top 5 recommendations of model A are presented, and then the top 5 recommendations of model B.

In another example, the model integrator may implement harmonic mean weighting to compute the combined score from normalized model scores of the models for each application. In such a scenario, the model evaluation score may be the weights used for the harmonic mean weighting. In other words, in the example in which model A has a model evaluation score of 13, model B has a model evaluation score of 17, and model C has a model evaluation score of 7, where the lower the better, then the model scores of model A may be multiplied by $\frac{1}{13}$, the model scores of model B may be multiplied by $\frac{1}{17}$, and then the model scores of model C may be multiplied by $\frac{1}{7}$.

Although FIG. 8 and the above presents a technique for training and evaluating models and the model integrator, other techniques may be used without departing from the scope of the invention.

Figure 9:
FIGS. 9, 10, and 11 show examples in accordance with one or more embodiments of the invention.
Figure 10:
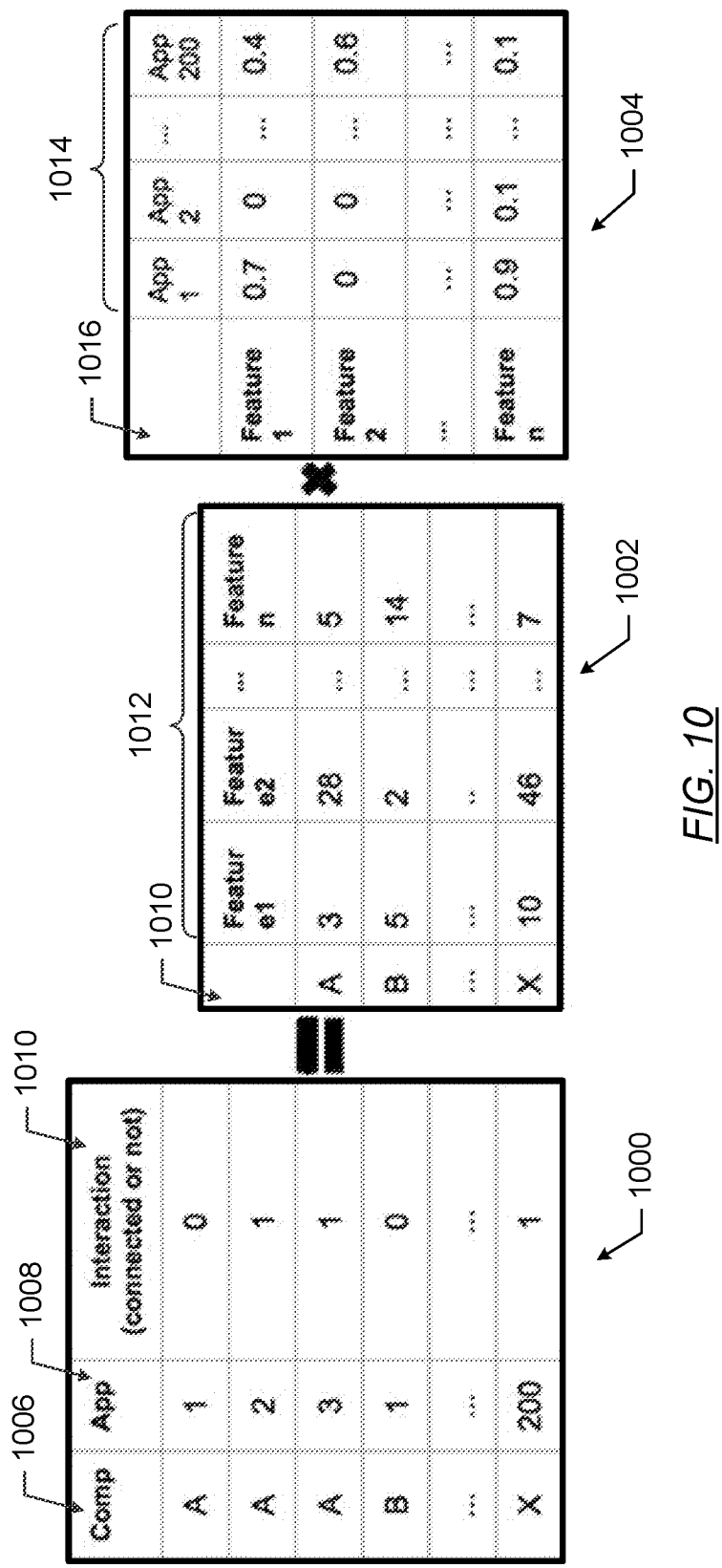
Figure 11:
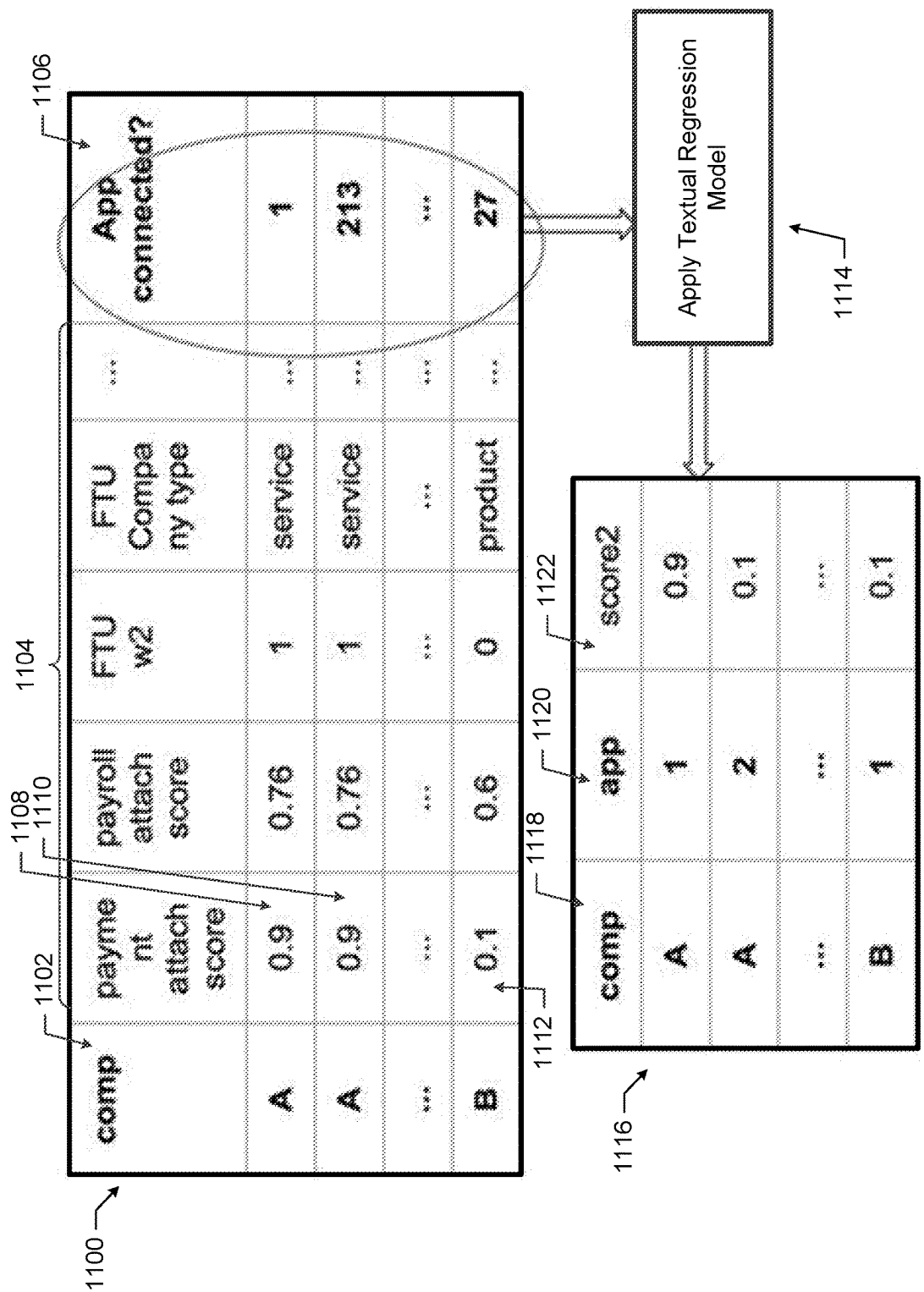

FIGS. 9-11 show examples in accordance with one or more embodiments of the invention. The following example is for explanatory purposes only and not intended to limit the scope of the invention.

FIG. 9 shows an example of implementing a similar user model to obtain similar user scores for software applications. In the example of FIG. 9, a chart (900) is shown having a first column (902) identifying a user computing device, the next n columns (904) identifying information about the user, and the last column (906) is a unique identifier of the software application to which the user computing device is connected. The binary values in the chart represents whether the user information is submitted by the user of the computing device. For example, "bakery" is submitted by user computing device A and not by user computing device B as shown by locations 908, 910, and 912. Each computing device has a row for each software application with which the computing device is connected. Thus, software applications 1 and 213 are both related to computing device A.

Continuing with FIG. 9, the textual regression model is applied (914) to the chart (900) to create recommendation chart (916). In recommendation chart (916), the first column (918) identifies the user computing device, the second column (920) is a unique identifier for the software application, and the third column (922) is the model score for recommending the software application to the user of the user computing device.

FIG. 10 shows an example diagram for applying a feature model. As shown in FIG. 10, a user software application matrix (1000) is decomposed into a user feature matrix (1002) and the feature software application matrix (1004) using software application feature information. The user software application matrix (1000) has a first column (1006) for each user computing device, a second column (1008) for each software application, and a third column (1010) for storing binary values indicating whether the user computing device is connected to the software application.

The user feature matrix (1002) relates each user computing device in the first column (1010) with the features in the remaining columns (1012) of the software application with which the user is connected. The value in the user feature matrix (1002) is the number of software applications to which the user is connected that exhibit the feature.

The feature software application matrix (1004) relates the software applications in the second and remaining columns (1014) to the corresponding features in the first column (1016) of the software application. The value within the matrix is the prominence of the feature in the software application.

After the decomposition, the user feature matrix (1002) is multiplied by the feature software application matrix (1004) to create a new matrix, similar to the user application matrix (1000) in which the third column (1010) is replaced with model scores for each software application.

FIG. 11 shows a flowchart for FIG. 11 shows an example of implementing a user submitted text model to obtain text scores for software applications. In the example of FIG. 11, a chart (1100) is shown having a first column (1102) identifying a user computing device, the next n columns (1104) identifying terms that may be entered by a user, and the last column (1106) is a unique identifier of the software application to which the user computing device is connected. The values in the chart represent the prevalence of the user submitted term as being submitted by the user of the computing device. For example, payment attach score has a value of 0.9 for user computing device A as shown in locations 1108, and 1110, and a value of 0.1 for user computing device B as shown in location 1112. Each computing device has a row for each software application with which the computing device is connected. Thus, software applications 1 and 213 are both related to computing device A.

Continuing with FIG. 11, the textual regression model is applied (1114) to the chart (1100) to create recommendation chart (1116). In recommendation chart (1116), the first column (1118) identifies the user computing device, the second column (1120) is a unique identifier for the software application, and the third column (1122) is the model score for recommending the software application to the user of the user computing device.

The model scores in the examples described above may be combined to generate a combined score. Based on the combined scores, the software applications are recommended to users.

Embodiments of the invention may be implemented on a computing system. Any combination of mobile, desktop, server, router, switch, embedded device, or other types of hardware may be used. For example, as shown in FIG. 12.1, the computing system (1200) may include one or more computer processors (1202), non-persistent storage (1204) (e.g., volatile memory, such as random access memory (RAM), cache memory), persistent storage (1206) (e.g., a hard disk, an optical drive such as a compact disk (CD) drive or digital versatile disk (DVD) drive, a flash memory, etc.), a communication interface (1212) (e.g., Bluetooth interface, infrared interface, network interface, optical interface, etc.), and numerous other elements and functionalities.

The computer processor(s) (1202) may be an integrated circuit for processing instructions. For example, the computer processor(s) may be one or more cores or micro-cores of a processor. The computing system (1200) may also include one or more input devices (1210), such as a touchscreen, keyboard, mouse, microphone, touchpad, electronic pen, or any other type of input device.

The communication interface (1212) may include an integrated circuit for connecting the computing system (1200) to a network (not shown) (e.g., a local area network (LAN), a wide area network (WAN) such as the Internet, mobile network, or any other type of network) and/or to another device, such as another computing device.

Further, the computing system (1200) may include one or more output devices (1208), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1202), non-persistent storage (1204), and persistent storage (1206). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1200) in FIG. 12.1 may be connected to or be a part of a network. For example, as shown in FIG. 12.2, the network (1220) may include multiple nodes (e.g., node X (1222), node Y (1224)). Each node may correspond to a computing system, such as the computing system shown in FIG. 12.1, or a group of nodes combined may correspond to the computing system shown in FIG. 12.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1200) may be located at a remote location and connected to the other elements over a network.

Although not shown in FIG. 12.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1222), node Y (1224)) in the network (1220) may be configured to provide services for a client device (1226). For example, the nodes may be part of a cloud computing system. The nodes may include functionality to receive requests from the client device (1226) and transmit responses to the client device (1226). The client device (1226) may be a computing system, such as the computing system shown in FIG. 12.1. Further, the client device (1226) may include and/or perform all or a portion of one or more embodiments of the invention.

The computing system or group of computing systems described in FIGS. 12.1 and 12.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present software application, between processes without departing from the scope of the invention. The processes may be part of the same or different software application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 12.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 12.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 12.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 12.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 12.1 and the nodes and/or client device in FIG. 12.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for recommendation model integration, comprising:
    filtering connected software applications from a plurality of software applications to obtain a set of unconnected software applications in the plurality of software applications;
    identifying at least one software application in the plurality of software applications selected by a user;
    filtering the set of unconnected software applications to obtain a filtered set of software applications by removing the at least one software application;
    obtaining, using a first model, a plurality of text scores ranking the filtered set of software applications according to a first plurality of user submitted terms in a source software application;
    obtaining, using a second model, a plurality of feature scores ranking the filtered set of software applications according to a plurality of features of the plurality of software applications;
    integrating the plurality of text scores and the plurality of feature scores to generate a plurality of combined scores for the filtered set of software applications; and
    presenting, to the user, the filtered set of software applications according to the plurality of combined scores.

2. The method of claim 1, further comprising:
    obtaining the first plurality of user submitted terms submitted by the user to the source software application;
    relating the plurality of user submitted terms to a portion of the filtered set of software applications; and
    applying a textual regression model based on a second plurality of user submitted terms submitted by a plurality of users to obtain the plurality of text scores.

3. The method of claim 1, further comprising:
    decomposing a user software application matrix into a user feature matrix and a feature software application matrix based on a software application feature mapping;
    multiplying the user feature matrix and the feature software application matrix to obtain a reconstructed user software application matrix; and
    scoring the filtered set of software applications based on the reconstructed user software application matrix to obtain the plurality of feature scores.

4. The method of claim 3, further comprising:
    selecting the plurality of features based on a training of the second model.

5. A method for recommendation model integration, comprising:
    obtaining, using a first model, a plurality of text scores ranking a plurality of software applications according to a first plurality of user submitted terms in a source software application;
    obtaining, using a second model, a plurality of feature scores ranking the plurality of software applications according to a plurality of features of the plurality of software applications;
    obtaining organizational data and user information;
    relating the organizational data and the user information to a plurality of connected software applications of the user;
    applying a random forest model trained based on a plurality of users, a plurality of corresponding organizational data to obtain a plurality of similar user scores for the plurality of software applications,
    integrating the plurality of text scores, the plurality of feature scores, and the plurality of similar user scores to generate a plurality of combined scores for the plurality of software applications; and
    thereafter presenting, to a user, the plurality of software applications according to the plurality of combined scores.

6. A method for recommendation model integration, comprising:
    obtaining, using a first model, a plurality of text scores ranking a plurality of software applications according to a first plurality of user submitted terms in a source software application;
    obtaining, using a second model, a plurality of feature scores ranking the plurality of software applications according to a plurality of features of the plurality of software applications;

generating a random number;
identifying a model range of the random number;
selecting, from the first model and the second model, a lead model corresponding to the model range;
integrating the plurality of text scores and the plurality of feature scores to generate a plurality of combined scores for the plurality of software applications, wherein integrating comprises:
setting the plurality of combined scores as a plurality of scores obtained from the lead model; and
presenting, to a user, the plurality of software applications according to the plurality of combined scores.

7. A method for recommendation model integration, comprising:
obtaining, using a first model, a plurality of text scores ranking a plurality of software applications according to a first plurality of user submitted terms in a source software application;
obtaining, using a second model, a plurality of feature scores ranking the plurality of software applications according to a plurality of features of the plurality of software applications;
integrating the plurality of text scores and the plurality of feature scores to generate a plurality of combined scores for the plurality of software applications;
identifying a plurality of predicted software applications predicted by the first model based on the plurality of combined scores;
for each of a plurality of users, calculating a user score according to a position of each connected software application that matches the plurality of predicted software applications and that is connected to the user;
aggregating the user score across the plurality of users to obtain a model evaluation score for the first model; and
presenting, to a user, the plurality of software applications according to the model evaluation score.

8. The method of claim 7, further comprising:
weighting, while integrating the plurality of text scores and the plurality of feature scores, the plurality of text scores with the model evaluation score to obtain the plurality of combined scores.

9. The method of claim 7, further comprising:
interleaving, while integrating the plurality of text scores and the plurality of feature scores, the plurality of text scores and the plurality of feature scores according to an order defined in part by the model evaluation score.

10. A method for recommendation model integration, comprising:
obtaining, using a first model, a plurality of text scores ranking a plurality of software applications according to a first plurality of user submitted terms in a source software application;
obtaining, using a second model, a plurality of feature scores ranking the plurality of software applications according to a plurality of features of the plurality of software applications;
integrating the plurality of text scores and the plurality of feature scores to generate a plurality of combined scores for the plurality of software applications;
performing an initial ranking based on the plurality of combined scores;
creating, using the initial ranking and incorporating a randomized error, a revised combined score for each of the plurality of combined scores to obtain a plurality of revised combined scores;
creating a revised ranking according to the plurality of revised combined scores, and
presenting, to a user, the plurality of software applications, wherein the plurality of software applications is presented in an order defined by the revised ranking.

11. A system for recommendation model integration, comprising:
a data repository for storing a first plurality of user submitted terms and a plurality of software application data; and
a computer processor executing a market application, the market application comprising:
a first model for obtaining a plurality of text scores ranking a plurality of software applications according to the first plurality of user submitted terms in a source software application,
a second model for obtaining a plurality of feature scores ranking the plurality of software applications according to a plurality of features of the plurality of software applications, the plurality of features obtained from the software application data in the data repository,
a model integrator for integrating the plurality of text scores and the plurality of feature scores to generate a plurality of combined scores for the plurality of software applications,
a user interface for presenting the plurality of software applications according to the plurality of combined scores, and
a third model for:
obtaining organizational data and user information,
relating organizational data and user information to a plurality of connected software applications of a user, and
applying a random forest model trained based on a plurality of users, a plurality of corresponding organizational data to obtain a plurality of similar user scores for the plurality of software applications,
wherein the plurality of similar user scores is integrated into the plurality of combined scores.

12. The system of claim 11, wherein the market application further comprises a software application usage tracker for tracking a user interaction with the plurality of software applications.

* * * * *